Patented Aug. 19, 1952

2,607,804

UNITED STATES PATENT OFFICE 2,607,804

MANUFACTURE OF POLY-ACETALS

Derrick John Fenne, Southfields, London, England, and Martin Mugdan, deceased, late of Richmond, England, by Magdalena Mugdan, executrix, Richmond, England, assignors to The Distillers Company Limited, Edinburgh, Scotland, a British company No Drawing. Application September 27, 1949, Serial No. 118,188. In Great Britain October 30, 1948

9 Claims. (Cl. 260—615)

The present invention relates to the manufacture of acetal condensation products.

It is known that di-acetals of the formula

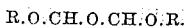

in which "R" stands for the methyl or ethyl group, can be prepared by reacting bis-(alpha chlor ethyl) ether with a solution of metallic sodium in methanol or ethanol (Geuther and Laatsch, Ann. 218, 1883, page 25).

It is an object of the present invention to produce poly-acetals by which term are to be understood compounds of the general formula

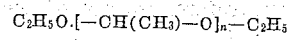

in which "$n$" is a numeral higher than 1, in particular 2 and 3. These compounds include the di-acetal and the tri-acetal, the latter having the formula $C_2H_5O-[-CH(CH_3)-O]_3-C_2H_5$. This compound is described according to the Geneva Nomenclature in two ways, namely: Alpha-alpha-1-diethoxy-diethyl-ether, or bis-alpha-ethoxy-ethyl ether.

The process of the invention for the manufacture of poly-acetals comprises reacting a mixture of acetal and monomeric anhydrous acetaldehyde at a temperature between plus 20° and minus 50° C. by the addition of a small amount of an acid substance and recovering the poly-acetals formed from the reaction mixture.

As acid substances may be used mineral acids such as hydrogen halogenides, for instance hydrochloric acid or hydrobromic acid, sulphuric acid or mono-alkylated sulphuric acids, such as methyl hydrogen sulphate. The quantity of acid to be added can vary within very wide limits and depends partly on whether the intention is to produce the di-acetal, the tri-acetal or higher acetals, and also on the temperature in the reaction mixture. The higher the temperature within the indicated limits the smaller can be the quantity of acid to be added. It has been found that at temperatures above zero a trace of the acid is sufficient to produce the desired effect. At the lower temperature as much as 0.5 mol per cent, based on whatever reacting component of the initial reaction mixture is present in the smaller quantity, may be used but in some cases, as little as 0.001 mol per cent or even less was found to be sufficient. It is desirable to add the acid in a diluted form in order to avoid too great an increase of temperature, as this may give rise to very violent reactions which might even assume an explosive character. As diluent for the acid such substances as ethyl ether or alcohol may be used with advantage. Thus, for instance, the hydrogen halides are applied dissolved in ethyl ether and the sulphuric acid diluted with ethanol or methanol. Care has to be taken, also, to cool the reaction mixture efficiently in order to maintain the temperature within the desired range. The molar ratio of acetal to acetaldehyde may also vary within wide limits; ratios of acetal to aldehyde from 2:1 to 1:6 may for instance be used. A predominance of acetaldehyde will lead to the preferential formation of polyacetals higher than the tri acetal which is also favoured by effecting the reaction at the lower temperatures within said range, that is between −10° and −50° C. A molar ratio of acetal to acetaldehyde of 2:1, on the other hand, leads to the production of a mixture which contains more di-acetal than tri- and poly-acetals.

When the reaction was carried out at temperatures of −50° C. and lower, it was found that with the formation of the poly-acetals increasing quantities of the auto-condensation products of acetaldehyde were formed. Small amounts of these latter substances were formed besides the production of polyacetals when the reaction was carried out according to the process of the invention.

The separation of the poly-acetals from metaldehyde, paraldehyde and unreacted acetal and acetaldehyde can be carried out by fractional distillation after the reaction mixture has been neutralised. The diacetal boils at 156.5 to 158.5° C. at ordinary pressure, whilst the triacetal has a boiling point of 84 to 89° C. at 5 mm. pressure and a refractive index $n_D^{20}=1.4087$.

The following examples illustrate the manner in which the process of the invention may be carried out in practice.

Example 1

Freshly distilled acetal (B. P. 103–104° C.) was mixed in equimolecular proportion with freshly distilled acetaldehyde and to 500 cc. of the mixture cooled to −45° C. was added 0.01 mol per cent of sulphuric acid (based on the initial acetaldehyde) diluted with methanol. The reaction mixture was kept at −45° C. for two hours, then neutralised and subjected to fractional distillation. 28% of the initial acetaldehyde were converted to di-acetal and tri-acetal and 9.3% to paraldehyde and metaldehyde.

Example 2

Acetal and acetaldehyde were mixed in a molar proportion of 2:1. 0.1 mol per cent of methyl hydrogen sulphate (based on the initial acetaldehyde) diluted with methanol was added at $-20°$ C. After two hours and treatment as indicated in Example 1, 40% of the acetaldehyde were converted to di-acetal and poly-acetal.

Example 3

When 0.1 mol per cent of methyl hydrogen sulphate was added to a mixture, as used in Example 2, at a temperature of 15° C. di-acetal in a yield of 15% (based on the initial acetaldehyde) was obtained after ½ hour.

Example 4

To a mixture of one mol of acetal and 6 mols of acetaldehyde was added 0.002 mol per cent of methyl hydrogen sulphate (based on the initial acetal) diluted with methanol at a temperature of $-40°$ C. After 1½ hours and neutralisation the reaction mixture yielded on fractionation 16.9 cc. of a mixture boiling between 128° C. and 180° C. and consisting mainly of di-acetal and some tri-acetal, and 15.0 cc. of a poly-acetal of the above given general formula, wherein "$n$" is 3 and greater than 3.

The poly-acetals produced according to the process of the invention may be used, e. g. as froth flotation agents and as organic intermediates.

We claim:

1. Process for the manufacture of polyacetals which comprises reacting a mixture of acetal and monomeric substantially anhydrous acetaldehyde in the presence of a small amount of an acid substance at a temperature between plus 20° and minus 50° C. and recovering the polyacetals formed from the reaction mixture.

2. Process according to claim 1, wherein said acid substance is sulphuric acid.

3. Process according to claim 1, wherein said acid substance is a mono-alkylated sulphuric acid.

4. Process according to claim 1, wherein the amount of said acid substance is between 0.5 and 0.001 mol per cent calculated on the amount of reacting component in said mixture of acetal and acetaldehyde which is present therein in the smallest quantity when the reaction is effected at a temperature below 0° C.

5. Process according to claim 1, which comprises adding said acid substance dissolved in a solvent selected from the group consisting of lower aliphatic ethers and alcohols.

6. Process for the manufacture of polyacetals which comprises reacting a mixture of acetal and monomeric substantially anhydrous acetaldehyde at a temperature between plus 20° and minus 50° C. by the addition of a small amount of a hydrogen halide in ethyl ether.

7. Process for the manufacture of polyacetals which comprises reacting a mixture of acetal and monomeric substantially anhydrous acetaldehyde in a molar ratio of acetal and acetaldehyde from 2:1 to 1:6 at a temperature between plus 20° and minus 50° C. by adding thereto a small quantity of an acid.

8. Process for the manufacture of polyacetals which comprises reacting a mixture of acetal and monomeric substantially anhydrous acetaldehyde in a molar ratio of one acetaldehyde to two acetal at a temperature between plus 20° and minus 50° C. by the addition of a small quantity of an acid for the preferential production of di-acetal.

9. Tri-acetal, boiling point 84–89° C. at 5 mm. pressure, refractive index $n_D^{20}$ 1.4087, having the structural formula $$C_2H_5O.[—CH(CH_3)—O]_3—C_2H_5$$

DERRICK JOHN FENNE.
MAGDALENA MUGDAN,

*Sole Executrix of the Last Will and Testament of Martin Mugdan, Deceased.*

REFERENCES CITED

The following references are of record in the file of this patent:

UNITED STATES PATENTS

| Number | Name | Date |
|---|---|---|
| 2,071,252 | Carothers | Feb. 16, 1937 |
| 2,110,499 | Carothers | Mar. 8, 1938 |
| 2,314,305 | Britton et al. | Mar. 16, 1943 |
| 2,321,542 | Brooks | June 8, 1943 |
| 2,321,557 | Sussman | June 8, 1943 |
| 2,321,593 | Gresham | June 15, 1943 |
| 2,379,703 | Geltner | July 3, 1945 |
| 2,449,469 | Gresham et al. | Sept. 14, 1948 |
| 2,473,994 | Gresham | June 21, 1949 |

OTHER REFERENCES

Ann. 218, 1883, page 25.